United States Patent
Al Sayeed et al.

(10) Patent No.: US 10,237,011 B2
(45) Date of Patent: Mar. 19, 2019

(54) METHODS AND APPARATUS FOR PRE-PROGRAMMING LAYER-0 SERVICE TURN UP SPEEDS FOR PHOTONIC SERVICE PROVISIONING OR RESTORATION

(71) Applicant: Ciena Corporation, Hanover, MD (US)

(72) Inventors: Choudhury A. Al Sayeed, Stittsville (CA); Dave C. Bownass, Ottawa (CA); David W. Boertjes, Nepean (CA); Dave Atkinson, Ottawa (CA); Dominic Richens, Perth (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/036,014

(22) Filed: Jul. 16, 2018

(65) Prior Publication Data

US 2018/0343077 A1    Nov. 29, 2018

Related U.S. Application Data

(63) Continuation of application No. 15/586,911, filed on May 4, 2017, now Pat. No. 10,050,737.

(51) Int. Cl.

| | |
|---|---|
| *H04B 10/00* | (2013.01) |
| *H04J 14/02* | (2006.01) |
| *H04B 10/27* | (2013.01) |
| *H04B 10/03* | (2013.01) |

(52) U.S. Cl.
CPC ............ *H04J 14/021* (2013.01); *H04B 10/03* (2013.01); *H04B 10/27* (2013.01); *H04J 14/0221* (2013.01)

(58) Field of Classification Search
USPC ........................................................ 398/1–9
See application file for complete search history.

(56) References Cited

U.S. PATENT DOCUMENTS

| | | | |
|---|---|---|---|
| 5,442,544 A | 8/1995 | Jelinek | |
| 7,444,078 B1 | 10/2008 | Stango et al. | |
| 7,826,748 B2 | 11/2010 | Yang et al. | |
| 7,873,274 B2 * | 1/2011 | Collings | H04B 10/07955 |
| | | | 398/18 |

(Continued)

OTHER PUBLICATIONS

Aggarwal et al., A Self-Tuning Analog Proportional-Integral-Derivative (PID) Controller, 2006, IEEE.

(Continued)

*Primary Examiner* — Agustin Bello
(74) *Attorney, Agent, or Firm* — Clements Bernard Walker PLLC; Christopher L. Bernard; Lawrence A. Baratta, Jr.

(57) ABSTRACT

Pre-programming Layer-0 optical protection path restoration speeds is provided based on available path margin. Higher layer routers and switches can be made aware of the expected Layer-0 restoration time, and their switch time can be programmed accordingly. The proposed method can provide users an option to program a restoration speed for a specific photonic service on a per restoration path basis. The method can highlight which services will potentially be impacted by the selected restoration speed on that path. The user can proceed with the selected speed for restoring high priority layer-0 services even if that means the fast restoring event can potentially impact other low priority services already in-service on the restoration path.

20 Claims, 14 Drawing Sheets

(56) References Cited

U.S. PATENT DOCUMENTS

| | | | |
|---|---|---|---|
| 7,894,721 B2* | 2/2011 | Roberts | H04B 10/0793 398/38 |
| 7,983,560 B2 | 7/2011 | Maki et al. | |
| 8,077,384 B2* | 12/2011 | Mori | H04B 10/2935 359/334 |
| 8,095,008 B2 | 1/2012 | Collings et al. | |
| 8,135,280 B2 | 3/2012 | Zong et al. | |
| 8,160,446 B2* | 4/2012 | Collings | H04B 10/07955 398/79 |
| 8,260,141 B2* | 9/2012 | Berg | H04J 14/0213 398/48 |
| 8,364,036 B2* | 1/2013 | Boertjes | H04J 14/0201 398/13 |
| 9,258,190 B2* | 2/2016 | Swinkels | H04L 41/0896 |
| 9,276,696 B2* | 3/2016 | Al Sayeed | H04J 14/0221 |
| 9,344,191 B2* | 5/2016 | Al Sayeed | H04B 10/07955 |
| 9,806,803 B2* | 10/2017 | Bownass | H04B 10/0795 |
| 9,831,947 B2* | 11/2017 | Boertjes | H04B 10/07953 |
| 9,853,762 B2* | 12/2017 | Evans | H04J 14/0221 |
| 2002/0191241 A1* | 12/2002 | Emery | H04J 14/0227 398/9 |
| 2003/0058497 A1 | 3/2003 | Park et al. | |
| 2006/0018658 A1 | 1/2006 | Mori | |
| 2007/0014571 A1* | 1/2007 | Roberts | H04B 10/0793 398/25 |
| 2007/0269215 A1 | 11/2007 | Sugaya | |
| 2008/0285973 A1 | 11/2008 | Uchiyama et al. | |
| 2009/0116837 A1* | 5/2009 | Boertjes | H04J 14/0201 398/58 |
| 2010/0091355 A1 | 4/2010 | Ota | |
| 2010/0104276 A1* | 4/2010 | Komaki | H04B 10/0775 398/17 |
| 2010/0202777 A1 | 8/2010 | Liu et al. | |
| 2010/0221004 A1 | 9/2010 | Haslam et al. | |
| 2011/0176802 A1 | 7/2011 | Callan | |
| 2011/0200324 A1 | 8/2011 | Boertjes et al. | |
| 2011/0222846 A1 | 9/2011 | Boertjes et al. | |
| 2011/0222851 A1* | 9/2011 | Berg | H04J 14/0212 398/48 |
| 2011/0222862 A1 | 9/2011 | Boertjes et al. | |
| 2011/0268442 A1 | 11/2011 | Boertjes et al. | |
| 2011/0274425 A1 | 11/2011 | Grobe | |
| 2015/0117858 A1* | 4/2015 | Al Sayeed | H04B 10/07955 398/38 |
| 2015/0229404 A1* | 8/2015 | Boertjes | H04B 10/516 398/183 |
| 2015/0229528 A1* | 8/2015 | Swinkels | H04L 41/0896 398/45 |
| 2015/0333824 A1* | 11/2015 | Swinkels | H04J 14/0227 398/25 |
| 2015/0333862 A1* | 11/2015 | Swinkels | H04J 14/0227 398/79 |
| 2015/0333864 A1* | 11/2015 | Swinkels | H04J 14/0227 398/79 |
| 2016/0050470 A1* | 2/2016 | Swinkels | H04Q 11/0062 398/45 |

OTHER PUBLICATIONS

PID Theory Explained, Mar. 29, 2011.

ITU-T, Telecommunication Standardization Sector of ITU, G.694.1, Spectral grids for WDM applications: DWDM frequency grid, Feb. 2012, pp. 1-16.

ITU-T, Telecommunication Standardization Sector of ITU, G.698.2, Amplified multichannel dense wavelength division multiplexing applications with single channel optical interfaces, Nov. 2011, pp. 1-38.

* cited by examiner

| Path Routing | Path Margin | Path Allowable Offset (±) | Controller Settings |
|---|---|---|---|
| I-J | 5dB | 6dB | Set_4 |
| I-E-B-L-C-F-J | 1dB | 2dB | Set_2 |
| I-E-B-G-H-C-F-J | 3dB | 4dB | Set_3 |

FIGURE 9A

| Local Node | I | | | |
|---|---|---|---|---|
| Remote Node | J | | | |
| Mesh-restorable Photonic Service | #1 | | | |
| Restoration Priority | High | | | |
| Restoration Controller Settings | Fastest Convergence Time | | | |
| Reversion Controller Settings | Path-appropriate | | | |
| Path Label | Routing | Path-appropriate Controller Settings | Service Priority Overwrite Controller Settings |
| Home Path | I-J | Set_4 | Set_4 |
| Restoration Path_1 | I-E-B-L-C-F-J | Set_2 | Set_4 |
| Restoration Path_2 | I-E-B-G-H-C-F-J | Set_3 | Set_4 |

FIGURE 9B

METHODS AND APPARATUS FOR PRE-PROGRAMMING LAYER-0 SERVICE TURN UP SPEEDS FOR PHOTONIC SERVICE PROVISIONING OR RESTORATION

CROSS-REFERENCE TO RELATED APPLICATIONS

The present application/patent is a continuation of U.S. patent application Ser. No. 15/586,911, filed May 4, 2017, and entitled "METHODS AND APPARATUS FOR PRE-PROGRAMMING LAYER-0 SERVICE TURN UP SPEEDS FOR PHOTON IC SERVICE PROVISIONING OR RESTORATION," the contents of which are incorporated by reference herein.

TECHNICAL FIELD

This invention relates to optical networking, and in particular, relates to systems and methods for Layer-0 path restoration and Layer-0 path provisioning. More particularly, the present disclosure relates to systems and methods for capacity changes in a Dense Wave Division Multiplexed (DWDM) optical network in a flexible spectrum deployment.

BACKGROUND

Layer-0 failure recovery is important in optical networking. Best in class optical networking deployments provide automatic failure recovery.

With increasing demands for bandwidth in optical networks, optical networking technologies are evolving to transmit more bits per second (bps) over optical links. The optical spectrum employed has been standardized such as in ITU-T Recommendation G.694.1 (June 2002) "Spectral Grids for WDM Applications: DWDM Frequency Grid" and ITU-T Recommendation G.698.2 (Novermber 2009) "Amplified Multichannel DWDM Applications with Single Channel Optical Interfaces," the contents of which are incorporated by reference herein. The optical spectrum can be segmented into transmission windows at different wavelengths such as a "C band" which is from about 1530 to about 1565 nm and which corresponds to the gain bandwidth of Erbium Doped Fiber Amplifiers (EDFAs). Other transmission windows can include an "L band" (from about 1565 to about 1625 nm), an "S band" (from about 1460 to about 1530 nm), etc. Conventionally, DWDM networks typically use a fixed bandwidth (e.g., 25, 50, 100, or 200 GHz) centered on the ITU grid (i.e., center channel wavelength/frequency) for each channel. This can be referred to as a "gridded DWDM optical spectrum," i.e. each channel occupies a spot on the grid in an associated transmission window. However, with higher number of bits per second being conveyed (especially beyond 100 Gbps), it is getting increasingly complex to fit channels within a fixed slotted spectral bandwidth. Allocating larger bandwidth channels is required for high baud rate signals, allocation which cannot respect the fixed grid ITU spectrum. Accordingly, there is a movement towards "gridless" or flexible DWDM spectrum where the (slot) width of the channels is flexible and/or variable (i.e., the slot width is uncertain before a slot is allocated). Optimal spectrum utilization or spectral mining is another reason to move towards flexible spectrum solutions where more channels can be grouped together without guard bands in between, groups which can potentially occupy the full DWDM spectral bandwidth. For comparisons, whereas in a conventional gridded system each channel has a predetermined bandwidth, i.e. 25, 50, 100, or 200 GHz, in flexible spectrum systems each channel has a variable bandwidth of N GHz, where N can be any amount of bandwidth and can be different for each channel.

FIG. 1 is a graph showing an example of a flexible spectrum 10 employed in an optical system. The flexible spectrum 10 illustrated includes four channels 12, 14, 16, 18. The first two channels 12, 14 occupy 50 GHz of bandwidth (wide) each with guard bands 20 (spaces) therebetween. For clarity, a conventional gridded system using 50 GHz spacing would include each channel on the optical spectrum being similar to channels 12, 14 shown. However, employing flexible spectrum, third channel 16 occupies 400 GHz (width) and can be, for example, a 2 Tbps signal. The fourth channel 18 is a 4×100 Gbps signal with each of the 100 Gbps signals occupying 37.5 GHz (width) for a total of 150 GHz (width). Channels 16, 18 can be referred to as 'super' channels and will be more common as more advanced modulation techniques are utilized to increase the number of bits per second conveyed.

In conventional gridded systems, adding or deleting a single channel has minimal impact on other existing in-service channels particularly when there are many such channels in such gridded systems; the guard spaces help. However, capacity change (i.e., adding or deleting a channel) has significantly more impact in flexible spectrum networks since such capacity change is no longer adding one channel among many as in gridded systems, but could be adding or deleting a significant portion of the spectrum. For example, adding or deleting either channel 16, 18 (with limited guard space) will have significant impact on in-service channels 12, 14.

However it is highly desirable, in either fixed grid or flexible grid optical systems, particularly while adding new bandwidth capacity along an optical path for lighting new photonic services to provide the additional bandwidth capacity without impairing the performance of existing photonic services already on that optical path. Conversely, while deleting bandwidth capacity along an optical link, in either fixed grid or flexible grid optical systems, extinguishing photonic services cannot impair the performance of remaining provisioned services on that optical link.

The time taken to complete restoration of a photonic service to a protection path is constrained partly due to optical hardware limitations to achieve a stable light output, and mostly due to the requirement of making only non-service affecting capacity changes on non-faulted optical links providing the restoration path. For clarity, per channel actuators in optical hardware can light up additional wavelengths relatively fast (typically in milliseconds) to provision a photonic service, however doing so each newly lit channel can create spectral gain cross-talk in neighbouring in-service channels.

When new optical signals (photonic services) are added to a path, due to changes in spectral loading over each optical link, the change triggers multiple physical effects which can result in a change in power and Optical Signal to Noise Ratio (OSNR) levels of pre-existing channels. Such physical effects imparted to existing channels are primarily caused by at least one of the following three factors:

Amplifier gain ripple and tilt: Different spectral loadings will result in different power gains at different frequencies over the spectrum;

Stimulated Raman Scattering (SRS) effect which appears especially with high per channel launch powers; and Spectral Hole Burning (SHB) effect which creates a photonic energy starving hole in the spectrum at the output of EDFAs which becomes more prevalent in low spectral loaded scenarios since the holes tend to disappear under heavy pumping levels.

A cumulative effect from all the factors highlighted above contributes to physical power level perturbations (glitches) experienced by existing provisioned photonic services, which unchecked can either result in undershoots causing lower OSNR for existing photonic services or overshoots causing non-linear impairments to neighboring photonic services. The magnitude of such physical perturbations further depends on the number of amplifiers in the optical path across the optical network and the spectral placement of the existing and newly added channels along the optical path.

FIGS. 2A, 2B, 3A and 3B illustrate examples of conventional Spectral Hole Burning (SHB) effects affecting existing photonic services due to an addition change in capacity.

FIGS. 2A and 2B show an example of the SHB effect on the power level of a pre-existing optical channel provisioned in an optical link (along an optical path). The in-service channel is represented by the power level signal peak above (Amplified Spontaneous Emission) ASE light background in FIG. 2A with some negative tilt applied. The existing in-service channel is provisioned at a target power shown in dashed line. While a group of channels is added in an energy starved portion of the spectrum, the power level of the existing channel(s) can overshoot as shown in FIG. 2B. With the amplifier over-gained due to compensation at the spectral hole, the power in the spectral hole is over-represented. This results in the existing in-service channel being overpowered.

FIGS. 3A and 3B show another example of the SHB effect on the power level of a pre-existing optical channel provisioned in a link (along an optical path). The in-service channel is provisioned at target power (shown in dashed line) in a low ASE light portion of the spectrum in FIG. 3A with some negative tilt applied. While a group of channels is added in an energy starved portion of the spectrum, the power level of the existing channel(s) can undershoot as shown in FIG. 3B. With the amplifier over-gained due to compensation of the spectral hole, the power in the spectral hole is over-represented. This (and the negative tilt) results in the existing in-service channel being under-powered.

In general, depending on where an existing in-service channel is located in the optical spectrum and depending where a channel is added in the spectrum different impairments can be experienced by the existing in-service channel. For certainty, while not shown, deleting a channel can and often does have an impairment on other existing in-service channels. In this sense, while per channel actuators in optical hardware can switch on additional wavelengths fast (typically in milliseconds), doing so can create spectral gain cross-talk (power glitches) in neighboring in-service channels.

The activation of per-channel actuators is typically slowed down in a controlled way to switch on in seconds instead of milliseconds. Examples of such methods include U.S. Pat. No. 9,344,191 entitled "Systems and Methods for Capacity Changes in DWDM Networks Including Flexible Spectrum Systems" issued May 17, 2016, the entirety of which is incorporated herein by reference. In brief, when adding (or restoring) channels to an optical path, the controllers need to consider the potential physical impairments on existing channels by: adding small increments of power for adding channels in the desired part of the spectrum, slowing down to monitor the power impairments on existing channels if any, and nullifying those impairments before adding more power into the spectrum. U.S. Pat. No. 9,344,191 describes a photonic controller configured to switch and move per channel actuators from one attenuation level to another in seconds, controller which employs live feedback data from optical per channel power monitors adding additional overheads for adding or deleting capacities in a network.

Therefore, capacity changes in an optical transmission line system remain a challenge. In particular, there is a need to improve optical path restoration functionality.

SUMMARY

While also present in Layer-0 photonic service provisioning, the above capacity change problems become even more apparent in providing Layer-0 restoration in an optical network deployment without optical protection switches despite restoration paths being known apriori.

FIG. 4 illustrates a simplified DWDM optical mesh network deployment for example supporting fixed grid or flexible spectrum photonic services. A number of Optical Add/Drop Multiplexer (OADM) nodes 50 are illustrated to provide physical layer connectivity via optical links 52 while the control (layer) plane includes a centralized control plane server 54 controlling sectional controllers (not shown) in each OADM node 50. Dotted links illustrate logical control connections to the control plane server 54 typically provisioned out-of-band over additional connections (not illustrated).

It is understood that the fiber spools 52 shown are very schematic, physical optical links can for example also include sequential optical amplifiers (EDFAs) 66 between fiber spans; only a few of which are shown/labeled. An optical path 56 is originally provisioned in the mesh network between the OADM 50A and the OADM 50B over three optical links 52 along the upper portion of the optical mesh network 50A->50H->50E->50B with the signal being added to and dropped from each optical link 52 at OADM nodes 50. Optical path 62B is provisioned to share link 52 between OADM nodes 50E and 50B with optical path 56. The provisioning of the in-service optical path 56 includes reserving a corresponding protection optical path 58 in the mesh network between OADM nodes 50A and 50B over five optical links 52 along the lower portion 50A->50C->50D->50F->50G->50B of the optical mesh network. This is the sense in which the protection path is said to be apriori known. Optical path 62B is provisioned to share sequential optical links 52 between nodes 50B->50G->50F with protection path 58, while optical path 62A is provisioned to share sequential optical links 52 between nodes 50F->50D->50C with protection path 58. The in-service configuration includes photonic services being lit as provisioned along the in-service optical paths 56, 62A and 62B, and dark along the protection optical path 58. It is understood that in an actual optical mesh network additional protection optical paths are reserved over additional photonic services elsewhere in the optical network but not shown solely for simplicity of description herein.

As soon as a fiber break, illustrated as the heavy cross 60, (or fiber related equipment failure) is detected in the mesh network, the Layer-0 control plane server 54 signals all OADM nodes 50A, 50H, 50E and 50B on the affected in-service optical path 56 to perform a delete of faulted photonic services which involves closing-down per channel actuators. Of note, on the optical section link 52 between nodes 50H and 50E adjacent to the detected fiber break 60, since all channels on that link 52 are already affected, closing down the actuators in one step as part of the delete action process between nodes 50H and 50E does not cause any additional performance impact (delete is not service affecting on that link). However, on the optical section links 52 between nodes 50A and 50H and 50E and 50B, a delete action with (one-step) actuator closing can be service affecting as mentioned hereinabove for example service affecting to optical path 62B. As the delete completes, the protection channel(s) is(are) restored on the protection path 58, typically using a sequential turn up of per channel actuators at each OADM node 50A, 50C, 50D, 50F, 50G and 50B along the lower portion of the optical mesh network. Similar to the delete action, if each photonic controller per optical section simply ramps to the given power target for all channels (in one single step), that can potentially be traffic impacting for other services running on that network sharing the same path or at least sharing an optical section within that path, for example optical paths 62A and 62B actively carrying in-service photonic services.

For clarity, per section photonic controllers, that have channels traversing all over the network with highly diversified topologies, do not have the end-to-end view of: the per channel operating Signal to Noise Ratio (SNR) margin, the total accumulated power fluctuations nor steady-state power offset each individual channel can tolerate. Without considering an end-to-end view on the performance impact of existing services in the mesh network that may take place if an aggressive ramp-up approach is taken, the photonic controllers along the protection path have to be cautious and conservative to follow a typical slow approach for making capacity changes per OADM section. In other words, such layer-0 restoration from failure is a slow by being reactive typically taking 10's of seconds to complete, the delay in restoring grows with the number of channel actuators along the path (six illustrated in FIG. 4).

While FIG. 4 illustrates a mesh network, it would be understood that the concepts and operating principles presented herein apply equally to linear and optical ring networks.

It has been discovered that the above identified shortcomings can be alleviated by proactively estimating available margins of all pre-existing photonic services along a protection optical path, services which can potentially be impacted by aggressive controller ramp ups (or slew rate) in any OADM section along the protection path. In general, in accordance with the proposed solution the available margins are proactively estimated along the protection path of each provisioned photonic service. In some embodiments the available margins along all protection optical paths in the mesh network are proactively estimated; for example in some implementations at the control plane server 54.

In accordance with the proposed solution, the available margin of existing services is employed as a deciding factor to select the optimal restoration speed for directing optical section controllers to change capacities on the affected photonic service paths, and hence, improve the overall restoration speed. In general, optical section controllers are directed to change capacities on multiple photonic service paths restoring photonic services affected by the fiber break.

In some embodiments, the proposed method pre-analyses these results and pre-saves path-appropriate optical section controller settings (such as slew rate, convergence time, controller coefficients) ahead of time so that at the time of restoration, the control plane can apply those settings to corresponding OADM photonic controllers to improve a non-service affecting restoration response at improved speed.

In some implementations, the proposed method also provides per photonic service restoration speed settings which can over-write path-appropriate controller settings if necessary at the time of restoration.

In accordance with the proposed solution, as the network controller adds new photonic services in the optical network, the network controller can ensure that the actual physical capacity change process remains non-service affecting to existing photonic services actively carrying traffic (along the provisioned paths).

In accordance with an aspect of the proposed solution there is provided a method of changing photonic service capacity along an optical transport path in an optical network, the method comprising: determining first available margins of all existing first services actively provisioned along the optical transport path according to a then present optical loading condition along the optical transport path; readjusting each first available margin by a first additional margin penalty each first active service would incur when the photonic service capacity would be changed along the optical transport path; obtaining a path margin from the readjusted first available margins; determining a maximum path allowable power offset from the path margin; and obtaining photonic controller settings which would generate less than the maximum allowable path allowable power offset for all first active services along the transport path during the photonic service capacity change.

In accordance with another aspect of the proposed solution there is provided a method of changing photonic service capacity along an optical transport path in an optical network, wherein the transport path is used to restore the faulted photonic service provisioned along the faulted photonic service path having remaining operational optical sections, for each optical section remaining in-service the method further comprising: determining second available margins of all existing second services actively provisioned along the optical section according to a then present optical loading condition along the faulted optical transport path; readjusting each second available margin by a second additional margin penalty each second active service would incur when the faulted photonic service would be removed from the optical section; obtaining an optical section margin from the readjusted second available margins; determining a maximum optical section allowable power offset from the optical section margin; and obtaining photonic controller settings which would generate less than the maximum allowable optical section allowable power offset for all second active services on the optical section.

In accordance with a further aspect of the proposed solution there is provided a control plane server for provisioning and monitoring photonic services in an optical network, for each photonic service capacity change the control plane server being configured to: determine available margins of all existing services actively provisioned along the optical transport path according to a then present optical loading condition along the optical transport path; readjust each available margin by an additional margin penalty each active service would incur when the photonic service capacity would be changed along the optical transport path; obtain a path margin from the readjusted available margins; determine a maximum path allowable power offset from the path margin; and obtain photonic controller settings which would generate less than the maximum allowable path allowable power offset for all active services along the transport path during the photonic service capacity change.

BRIEF DESCRIPTION OF THE DRAWINGS

The proposed solution will be better understood by way of the following detailed description of embodiments of the invention with reference to the appended drawings, in which:

FIGS. 9A and 9B are schematic diagrams illustrating data sets produced by methods and systems in accordance with some implementations of the proposed solution.

DETAILED DESCRIPTION

In accordance with an embodiment of the proposed solution, pre-programming of path-appropriate Layer-0 restoration parameters is provided considering available margin of all existing services to provide improved speed of restoration.

In accordance with an implementation of the proposed solution, network administrators and/or other control planes are enabled to pre-program service specific Layer-0 restoration speed parameters that can over-write path-appropriate restoration set up on photonic actuators regardless of restoration paths or other existing services.

Figure 1:
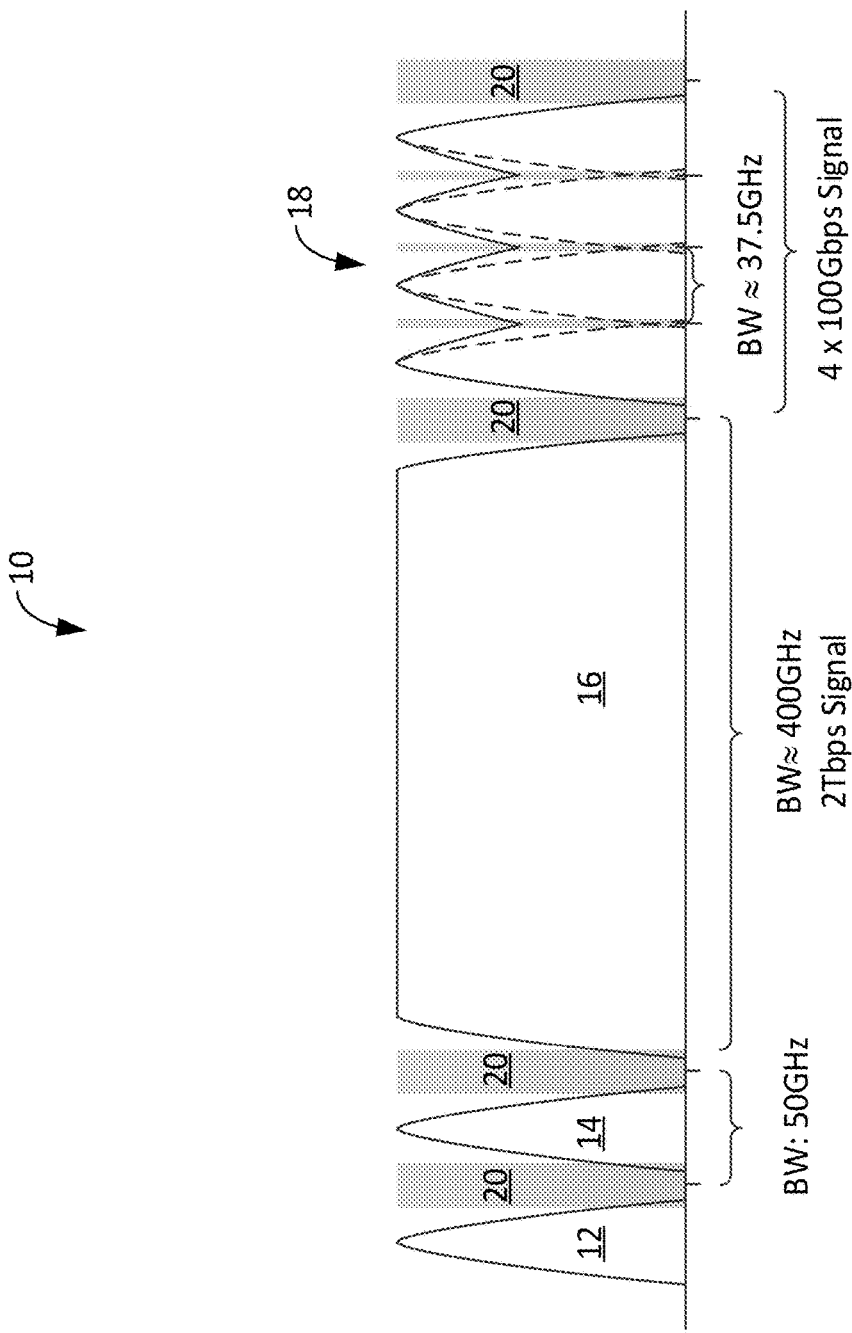
FIG. 1 is a graph of optical spectrum of a flexible spectrum system.
Figure 2A:
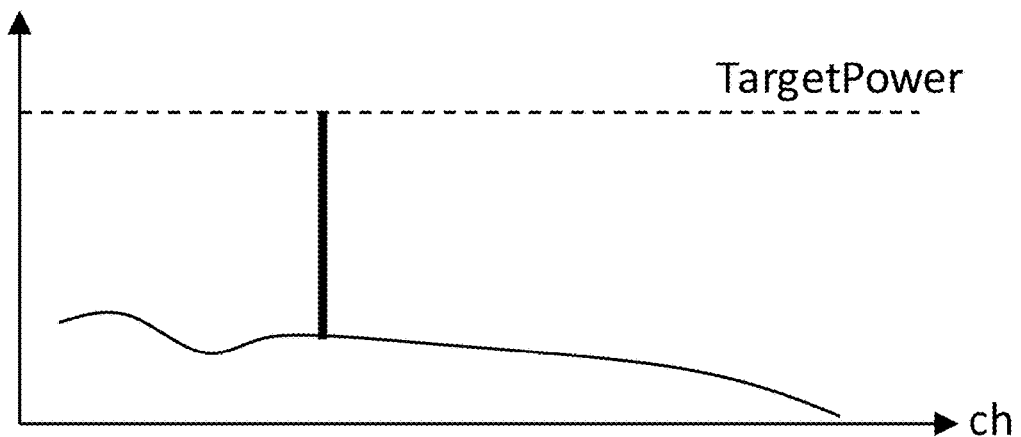
FIGS. 2A and 2B are schematic diagrams illustrating before and after power distribution graphs showing how Spectral Hole Burning (SHB) affects an existing photonic service due to a capacity change.
Figure 2B:
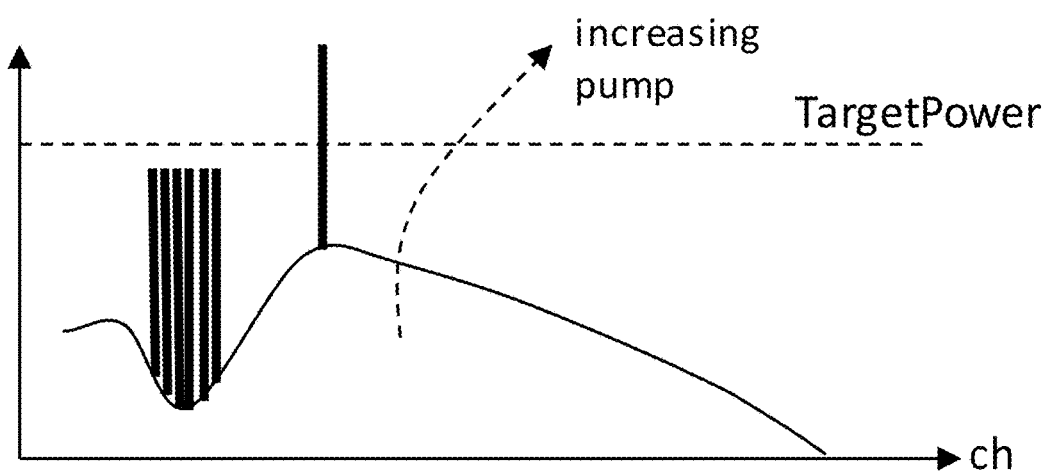
Figure 3A:
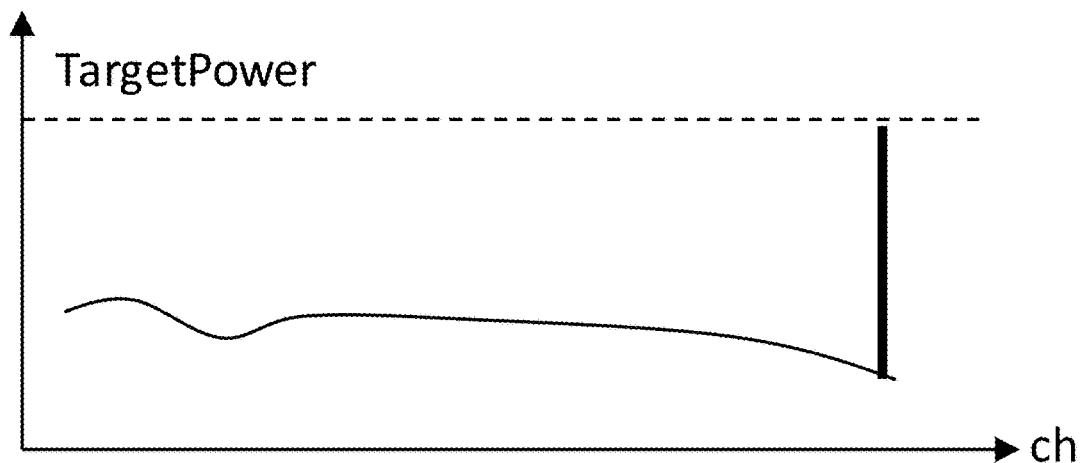
FIGS. 3A and 3B are schematic diagrams illustrating before and after power distribution graphs showing how Spectral Hole Burning (SHB) affects another existing photonic service due to a capacity change.
Figure 3B:
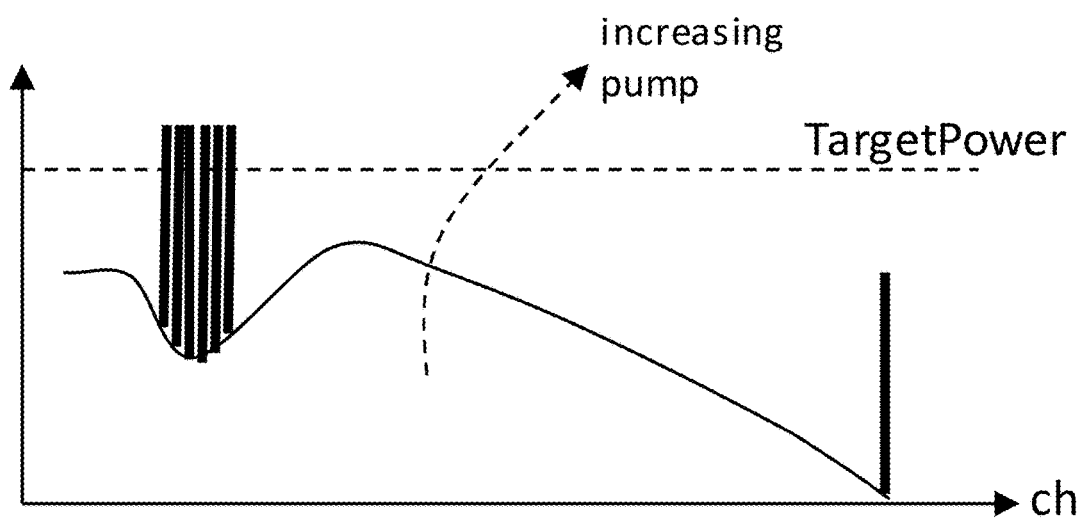
Figure 4:
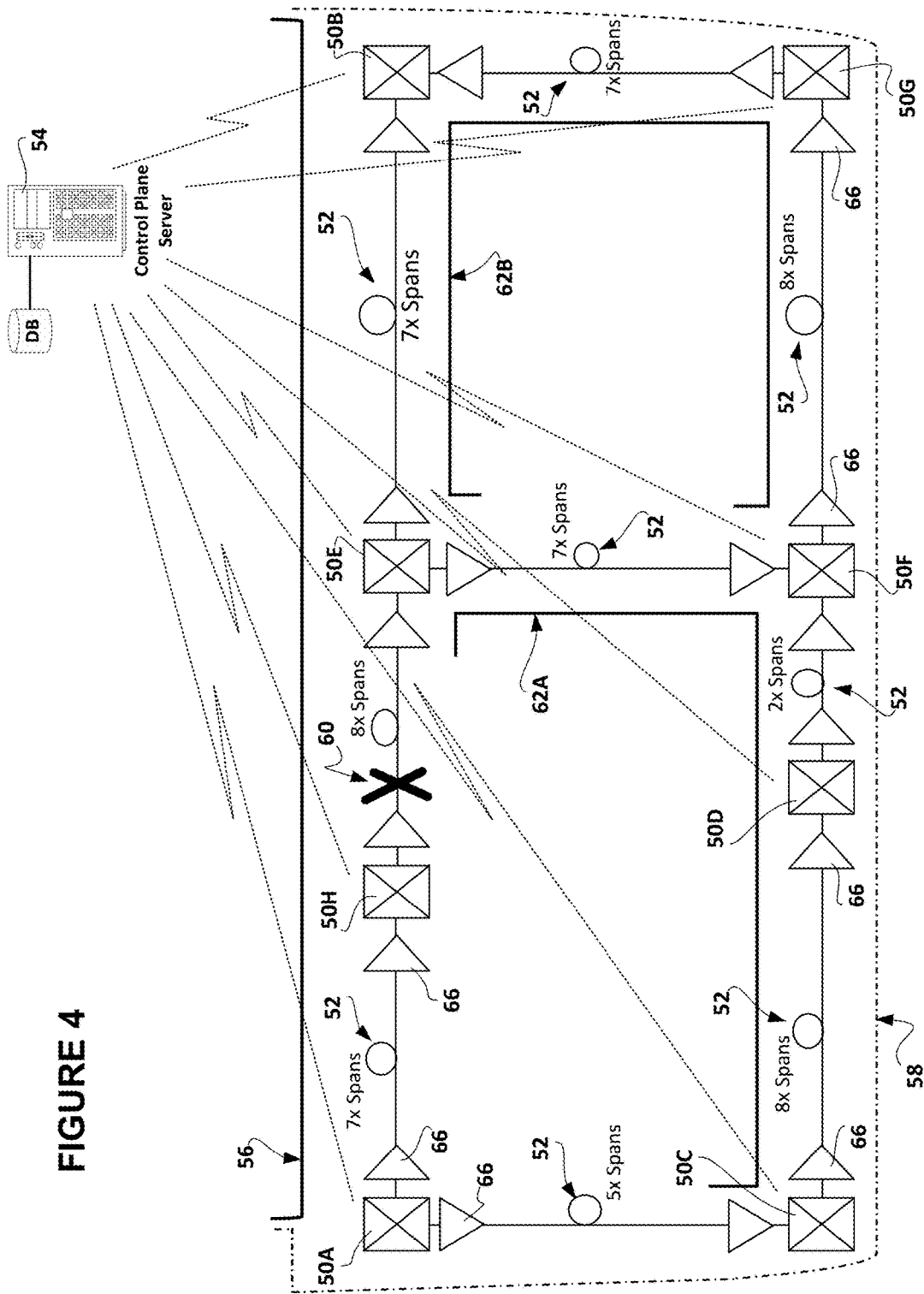
FIG. 4 is schematic diagram illustrating a simplified optical network deployment to illustrate the proposed solution.
Figure 5:
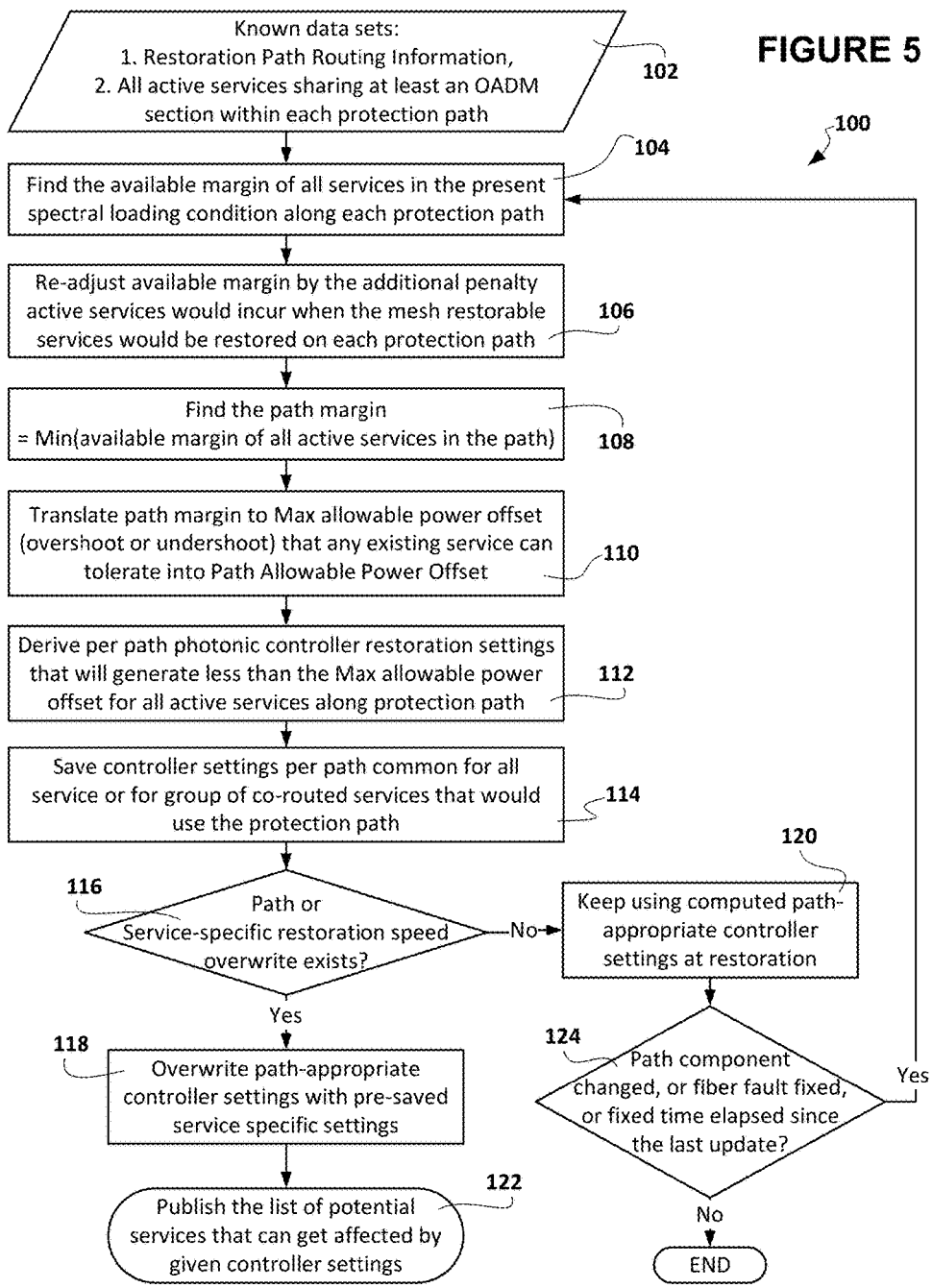
FIG. 5 is a schematic flow diagram illustrating a process in accordance with an embodiment of the proposed solution.

FIG. 5 schematically illustrates a process flow in accordance with an embodiment of the proposed solution. Such a process 100 for pre-programming Layer-0 restoration speed starts at 102 with at least each OADM node 50 in the optical network knowing the (in-service) restorable services originating on that node 50, preferably the control plane (server 54) is also knowledgeable of restorable services provisioned in the optical network. The control plane (server 54) is also knowledgeable of the possible protection optical paths (not-in-service) for each restorable service, for example protection path 58 for in-service photonic service 56 between the originating 50A and the destination node 50B pair. It is understood that this knowledge can be provided by other path provisioning processes, for example performed by the control plane server 54 or other path provisioning network controller(s). In some implementations such optical path knowledge is tracked for example in a (local/distributed/central) service provisioning database.

With each protection path being considered by default viable for the corresponding restorable service, for each protection path 58 process 100 finds all other active services (56) in the optical network which are currently either sharing the same path or using at least one optical section (from one OADM 50 to the next OADM 50, where the spectral loading on the fiber 52 remains constant) along the path 58.

For each active service in each protection path, process 100 estimates, at 104, available margin. The margin parameter can for example be defined for a service in terms of a difference (delta) between the accumulated Optical Signal to Noise Ratio (OSNR) in the path and the minimum OSNR required for any receiver (Rx) to successfully lock onto the signal of interest to run error free operation. As another example, the available margin can also be defined for a service in Signal-to-Noise Ratio (SNR) format as well, where SNR includes the impact of OSNR and the impact of propagation in the transmission fiber including nonlinear cross-talk. The SNR and OSNR also have a scaling factor which is defined by the Baud rate and the effective bandwidth of the optical signal. At 104, the margin for a service can be calculated in multiple ways for a photonic service using data measured from systems and transponder. The OSNR available margin for an existing photonic service can be estimated, for example, without limiting the invention thereto based on performance metrics including but not limited to: Pre-FEC (Forward Error Correction) BER (bit error rate), dBQ (Q-factor on a dB scale) measured from the transponder, etc., and based on measured and/or estimated OSNR of the photonic service after traversing through the path. For example, in accordance with a specific implementation of the proposed solution, an analytic formula for relating BER to Signal-to-Noise Ratio (SNR) for Dual Polarization Quadrature Phase Shift Keying (DP-QPSK) signal can be presented as:

$$Q = \sqrt{2} * erfc^{-1}(2*BER)$$

$$SNR_{dB} = 10*Log_{10}(Q^2)$$

For custom modulation formats, lookup tables can be employed to convert the measured Q-factor or BER into an SNR value. Once the current operating SNR is determined, the SNR margin can be obtained by taking the delta with the minimum SNR required to ensure the FEC will still be able to provide error free operation.

Figure 6A:
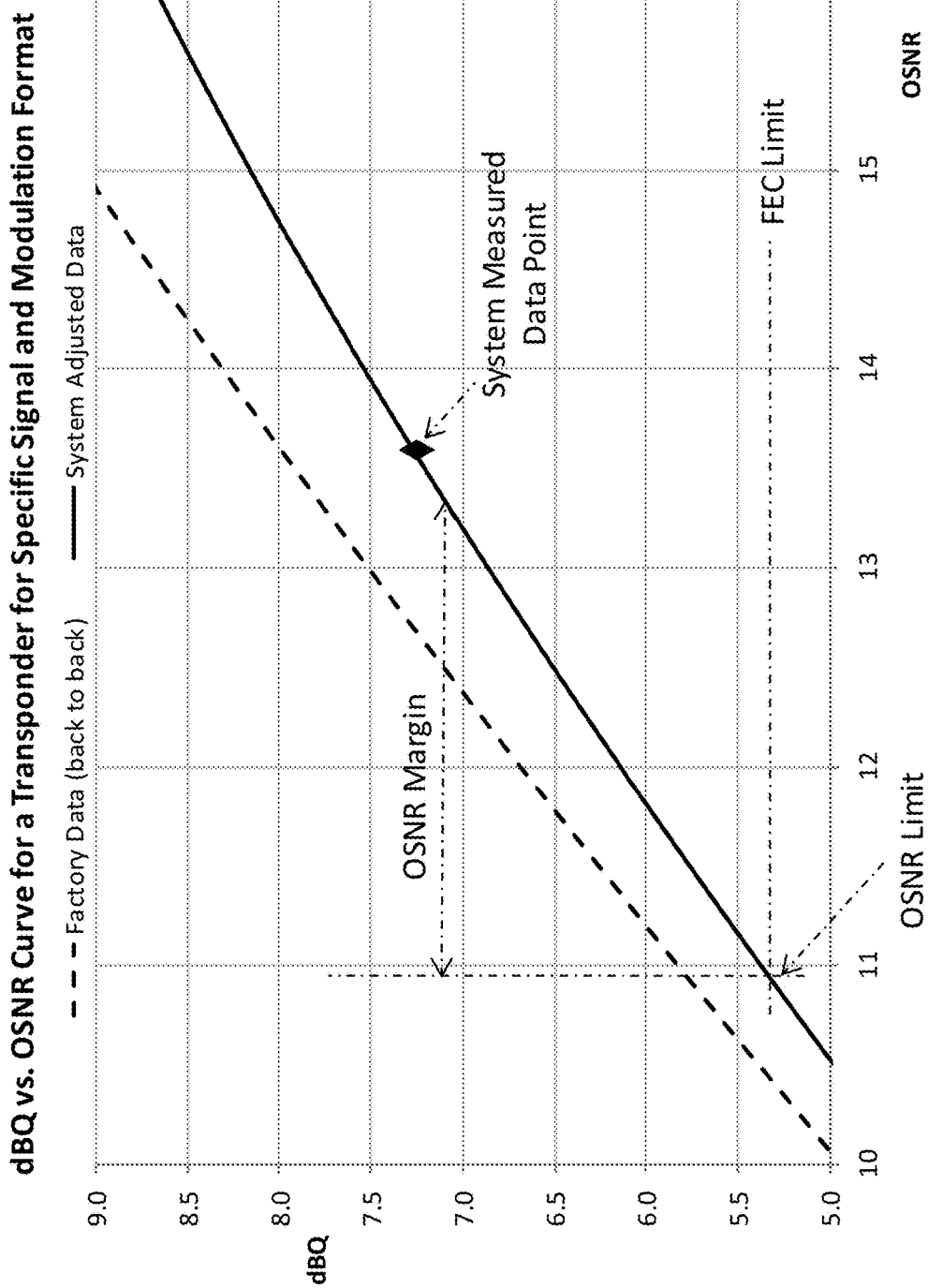
FIGS. 6A and 6B are schematic diagrams graphically illustrating examples of margins for photonic services in accordance with various embodiments of the proposed solution.

In accordance with an implementation of the proposed solution, another method for estimating margin is to use a Q vs. OSNR curve is illustrated in FIG. 6A. Such a Q vs. OSNR curve can be obtained for each service specific line facing transponder while calibrated in factory, which can be further adjusted by adding other non-linear impacts and filter penalties in each corresponding path such that the measured data point from the system lies on an adjusted the System Curve (denoted as System-Adjusted data in the graph). The minimum OSNR for the transponder is represented on the graph in FIG. 6A by OSNR limit data point on the System Adjusted curve.

In some implementations the factory calibration data can be provided via a table lookup, while in other implementations the factory calibration data can include a functional dependency characterized by a small number of parameters. In preferred implementations, the system-adjusted data is computed on the fly based on optical path specifications and then currently obtained optical network data. In some implementations computation of the system adjusted data can be performed at the centralized control plane server 54 having complete information regarding service provisioning in the optical network, however in preferred implementations the system adjusted data can be computed at distributed "in-skin" control plane (intermediary controllers) having sufficiently complete visibility with respect to the original in-service optical path and/or its corresponding protection path providing restoration.

Considering that in general multiple protection paths can share optical sections, knowing the per-service available margin helps to derive the path margin. Once the available margins for each active service are known, the values are further adjusted, at 106, by considering additional penalties each photonic services will incur when the new set of restorable services will be restored and optimized on each corresponding protection path. One possible approach to readjust the available margins can include taking into consideration exactly where in the spectral locations and at which power level, the new set of channels will be restored (and/or provisioned) and performing a full mathematical modeling and simulation of the physical line system to quantify the impact on the SNR margin of the existing channels due to change in spectral loading conditions on the amplifiers and due to impact of SRS, amplifier gain ripple and tilt effects. Another possible approach can include modeling through phenomenological means wherein measured margin feedback from the (optical transport) system which undergoes changes in spectral loading on an ongoing basis is used in a machine learning algorithm or to train a neural network or the like. Such an algorithm, once sufficiently trained on an optical network, can be employed to determine the impact on the SNR margin of existing channels due to changes in spectral loading conditions in the optical network.

Once the re-adjusted margin is known for all existing in-service channels, a Path Margin is then calculated, at 108, for example by taking the minimum of the adjusted-margins of all active services on that protection path. The Path Margin value is then translated, at 110, to a maximum allowable power offset (in terms of overshoot or undershoot) that the existing active service with the minimum margin on that protection path can tolerate, or most conservatively in any other path if multiple protection paths are possible. In accordance with some implementations the translation includes a table lookup, while in accordance with other implementations a predictive linear approximation is employed. In accordance with a preferred embodiment of the proposed solution real time physical modeling is employed (for example as described hereinbelow).

Figure 6B:
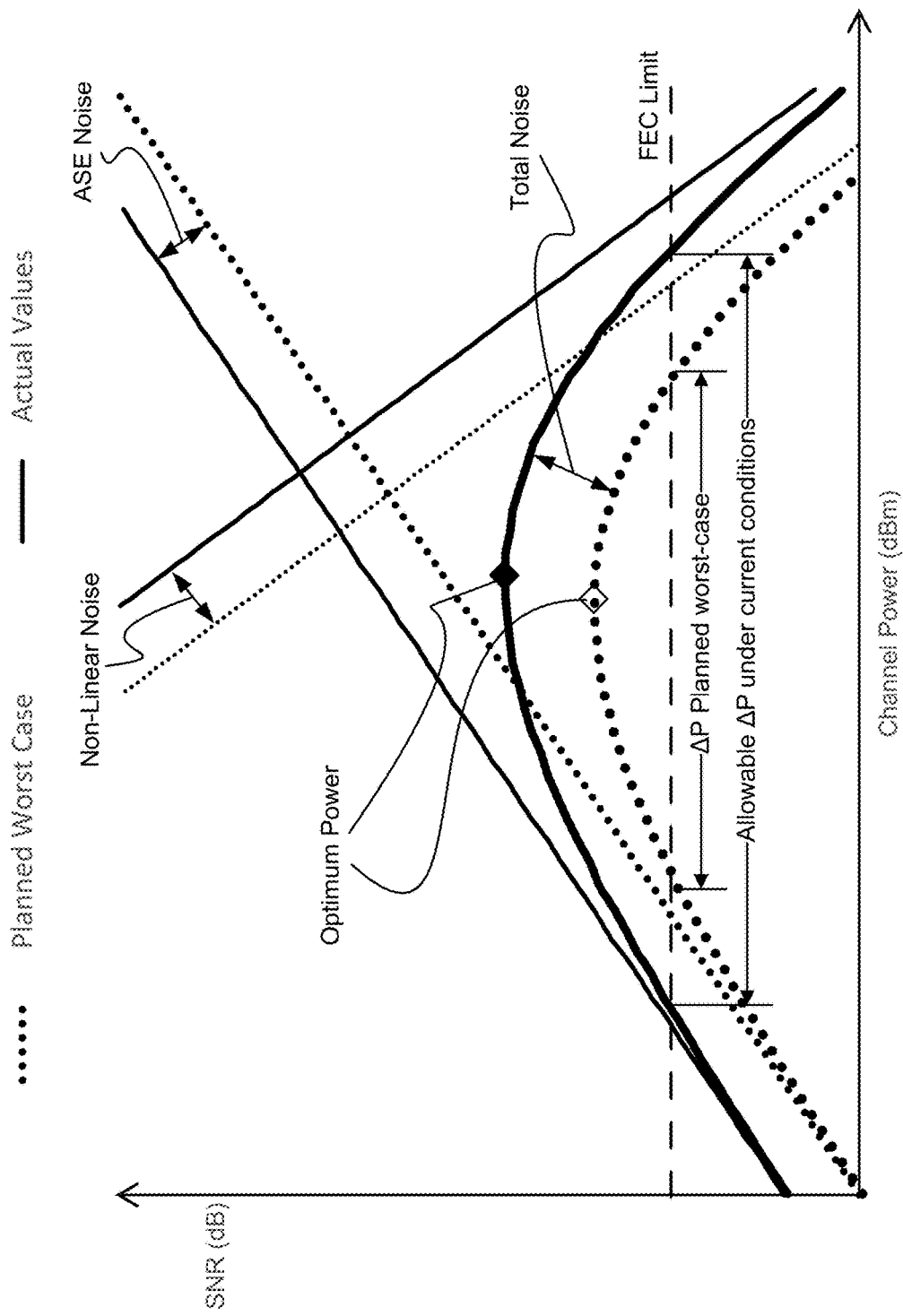

In accordance with the proposed solution, the implementation illustrated in FIG. 6A can be enhanced by considering a SNR margin vs. per channel power perturbation model for example as illustrated in FIG. 6B.

FIG. 6B describes the SNR margin for a channel initially going up with an increase in channel launch power into the fiber, and at some point, when the non-linear noise component becomes too high, the SNR margin starts to drop. The graph illustrates a power vs. SNR curve based on the worst case planned data points, and a similar adjusted curve based on the current system measured conditions. The planned data can be obtained based on factory calibrated data points for the specific transmitter/receiver (Tx/Rx) type, its Baud rate, line rate and modulation format, using mathematical modeling of the physical line system. For the current system measured conditions, the curve can be obtained using measured SNR margin (based on BER or Q) and current launch power into the fiber, based on measured ASE noise and presently estimated non-linear noise penalty components. For either curve, there is a FEC limit for SNR margin beyond which, the receiver fails to acquire error free traffic detection. For both the worst-case margin conditions and the present network conditions, the graph enables obtaining the perturbation room for channel launch power, which is then translated into an allowable power offset for each channel from its optimum launch power target. As described earlier, the allowable power offset for a channel with minimum SNR margin in a path defines the allowable power perturbation (also known as Path Allowable Power Offset) for any fiber span within that path.

The result is referred to as the Path Allowable Power Offset, which is then used, at 112, to derive photonic controller settings per OADM sections along the protection path to ensure that the photonic controller settings will generate less than the maximum allowable power offset for active services along the protection path.

For example, in terms of photonic controller settings per OADM section along the protection path, such photonic controller settings include, but are not limited to, slew rate, response time (also known as controller convergence time to achieve a given target), delta time between two consecutive controller cycles, and controller coefficients such as Proportional-Integral-Derivative (PID) coefficients for photonic controllers responsible for controlling per channel actuators as well settings for optimizing the spectrum in an optical line system. A set of (optical section) controller settings can be pre-defined based on actual network testing or simulations for which, if enabled for restoring channels on protection paths, the end-to-end convergence time to restore those channels on a protection path, and the maximum power offset the particular controller setting can generate on existing active services are known. Offline simulations or testing can ensure that particular controller settings also provide a stable response within the optical network.

In accordance with one embodiment of the proposed solution, one approach can be based on Path Allowable Power Offset: the method automatically looks up the available pre-defined controller settings and selects a setting that provides a power offset for existing active services, setting which is less than or equal to the Path Allowable Power Offset value. With this approach, the method ensures non-service affecting controller settings to restore the restorable services and yet able to advertise the expected restoration time based on controller convergence. This approach is regarded as providing 114 automatic conservative controller settings.

In accordance with another embodiment of the proposed solution, another approach enables an administrator or higher layer controllers to set a desired Layer-0 restoration speed. An input time value is then compared 116 with available controller settings and their convergence time, and a setting is selected which can either meet 118 the desired speed criteria or provides 120 the fastest possible compared to the desired criteria as constrained by physical hardware limitations such as minimum actuator response time and optical power measurement scanning time to get a fresh optical power data to act on. Since the approach in 118 does not select controller settings based on power offset, the selected settings can generate a power offset that is higher than the Path Allowable Power Offset value, and can potentially impact services on the path running with low margin. With this approach 118, the process also (highlights) advertises 122 the potential existing services that could be affected while the restoration will take place on that protection path. Regardless, in some implementations, the administrator or higher layer controller can proceed with this approach if, for example, the affected services are deemed to be lower priority than the given restorable services' desired restoration time. This approach is regarded as providing comparatively risky manual override controller settings.

Irrespective of which approach is used, once the controller settings are selected for a protection path, the setting is then pre-saved for example in static data sets, for each protection path so that any MR-service or group of co-routed services that will use the protection path can use the settings at the time of restoration on that protection path. In preferred implementations, before restoration on to a protection path the control plane applies the selected controller settings per OADM node, where the typical photonic controllers (such as per channel controller and spectrum controllers) reside.

In accordance with preferred embodiments, the control plane settings are selected such that the given set of settings the affected OADM nodes/node controllers/optical section controllers act in unison, preferably in parallel, to provide a unified restoration time regardless of the number of existing services on that protection path or the number of services that will be restored on that protection path.

In accordance with a preferred embodiment of the proposed solution, the available adjusted margins for existing services employed to decide on controller settings are periodically 124 estimated considering then present network conditions before the restoration is triggered so that the expected Layer-0 restoration time is either known or can be programmed ahead of time.

Without limiting the invention, instead of the periodic estimation approach, it is also possible to employ methods for dynamically deciding restoration speed settings around the time of restoration on a specific protection path (for example after the fault 60 is detected and restoration is triggered for restorable services) based on the protection path's present spectral loading conditions and their available adjusted-margins for only restoring services affected by the fault 60. For clarity, while the proposed solution had been described to include proactive computation of controller settings, computing controller setting for all protection paths in the optical network is not required each and every time a fault occurs. However, when a new photonic service is provisioned proactive computation of controller settings for all protection paths in the optical network may be initiated or preferably scheduled.

It is understood that process steps involving table lookups in factory calibration data can be performed closer to, or by, Optical Section Controllers 56 in a distributed fashion for a number of optical paths, while the computation (functional extrapolation, perturbation model computation, etc.) can be performed by control components closer to, or in a centralized fashion by the control plane server 54, before and/or just prior to service restoration over the protection path. Employing the combination of table lookups, functional extrapolations and perturbation model computations enables a faster, preferably time parallel, convergence time without impacting existing in-service optical paths.

In Use

Figure 7A:
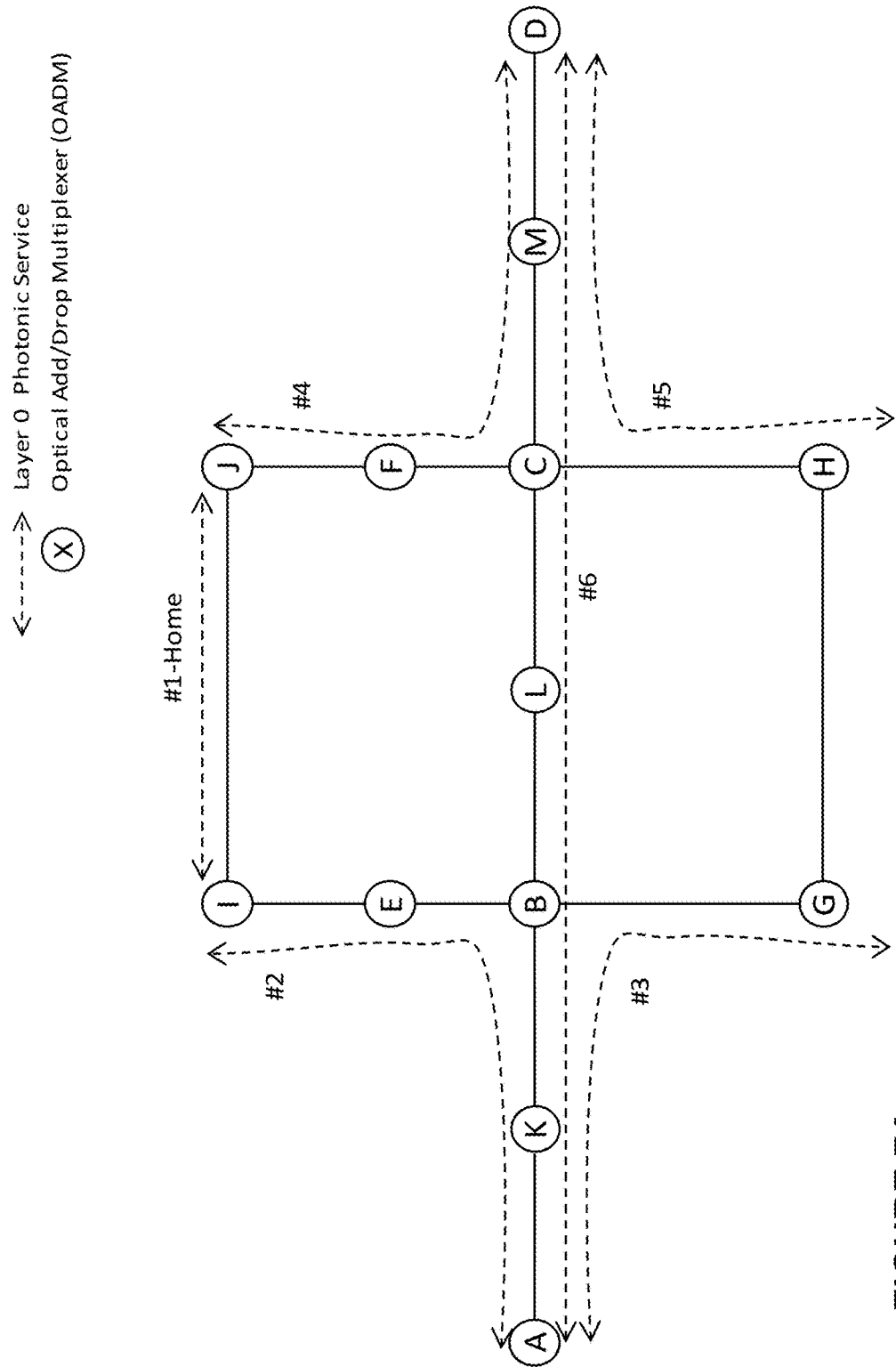
FIG. 7A is a schematic mesh network diagram illustrating an example of photonic services provisioned in a mesh network.
Figure 7B:
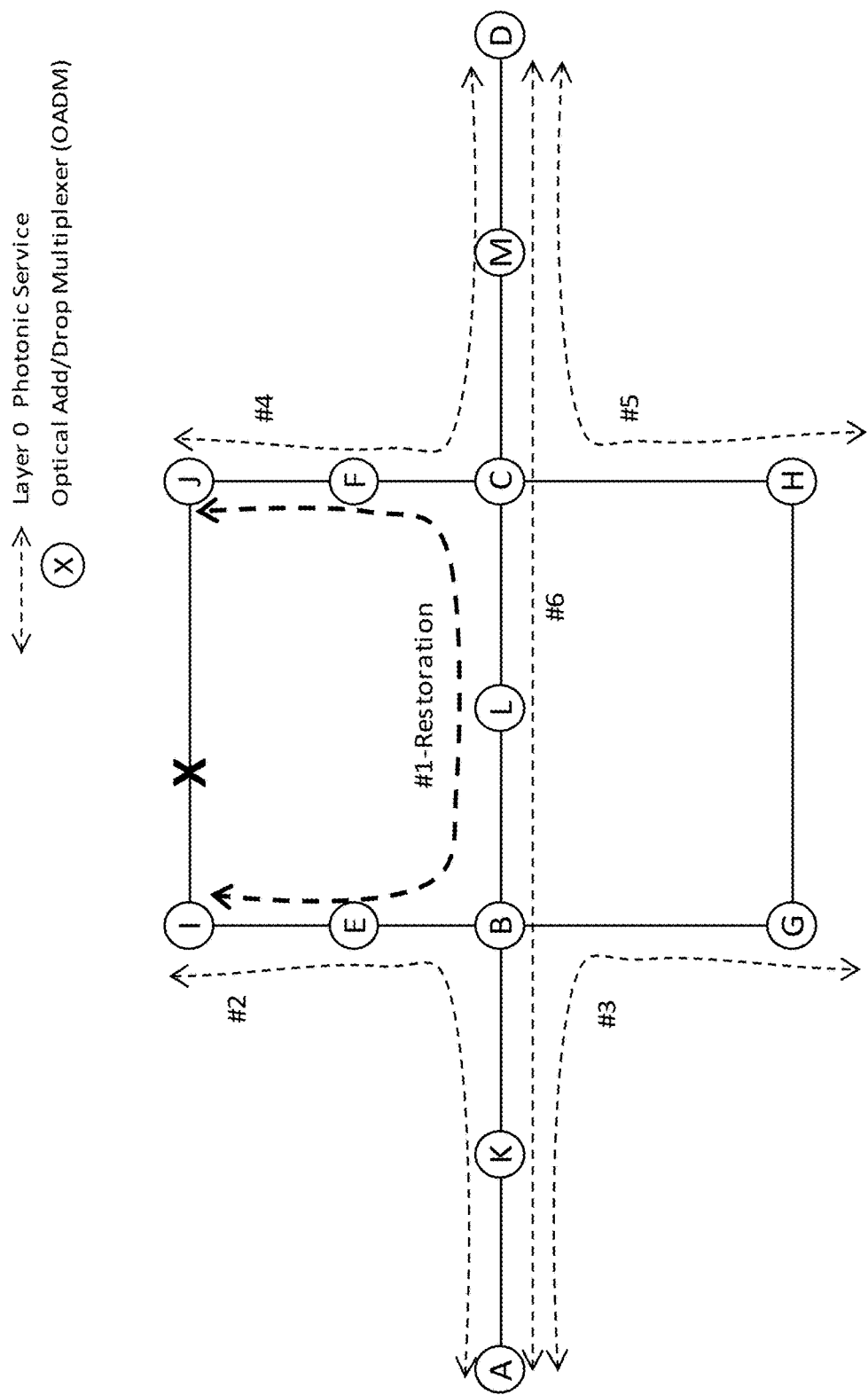
FIGS. 7B and 7C are schematic mesh network diagrams illustrating various use scenarios of methods and systems in accordance with various embodiments of the proposed solution.
Figure 7C:
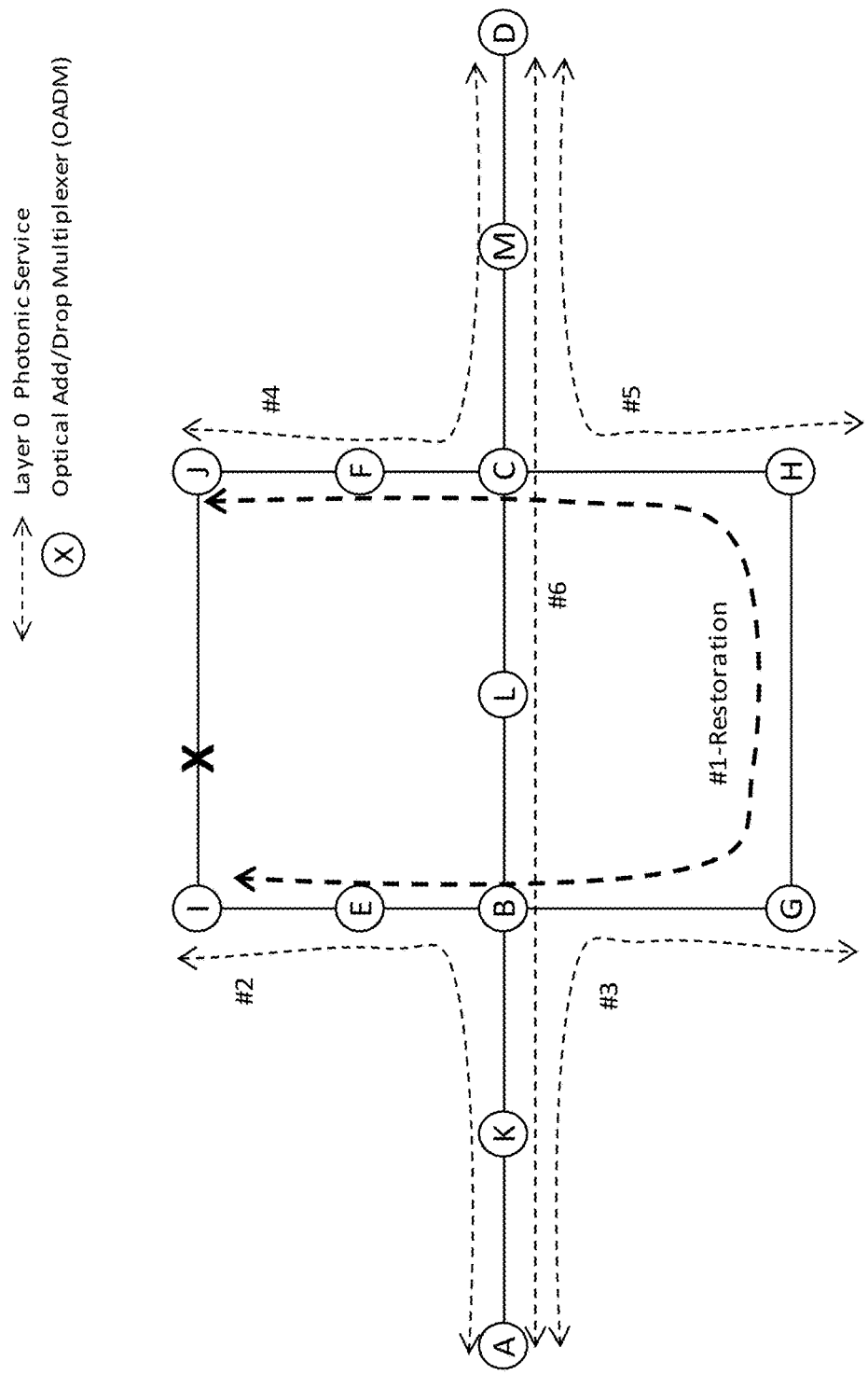

FIGS. 7A, 7B and 7C illustrate schematic mesh network views of a network restoration example employing the proposed solution.

To further illustrate the proposed method, an optical mesh network example is shown in FIG. 7A, where restoration speed is pre-programmed for a mesh-restorable photonic service #1 currently provisioned on its home path I-J. In accordance with this example, photonic service #1 has two viable restoration paths in the mesh network should a fault occur on its home path: protection Path_1 option I-E-B-L-C-F-J is schematically illustrated in FIG. 7B, and protection Path_2 option I-E-B-G-H-C-F-J is schematically illustrated in FIG. 7C.

Figure 8A:
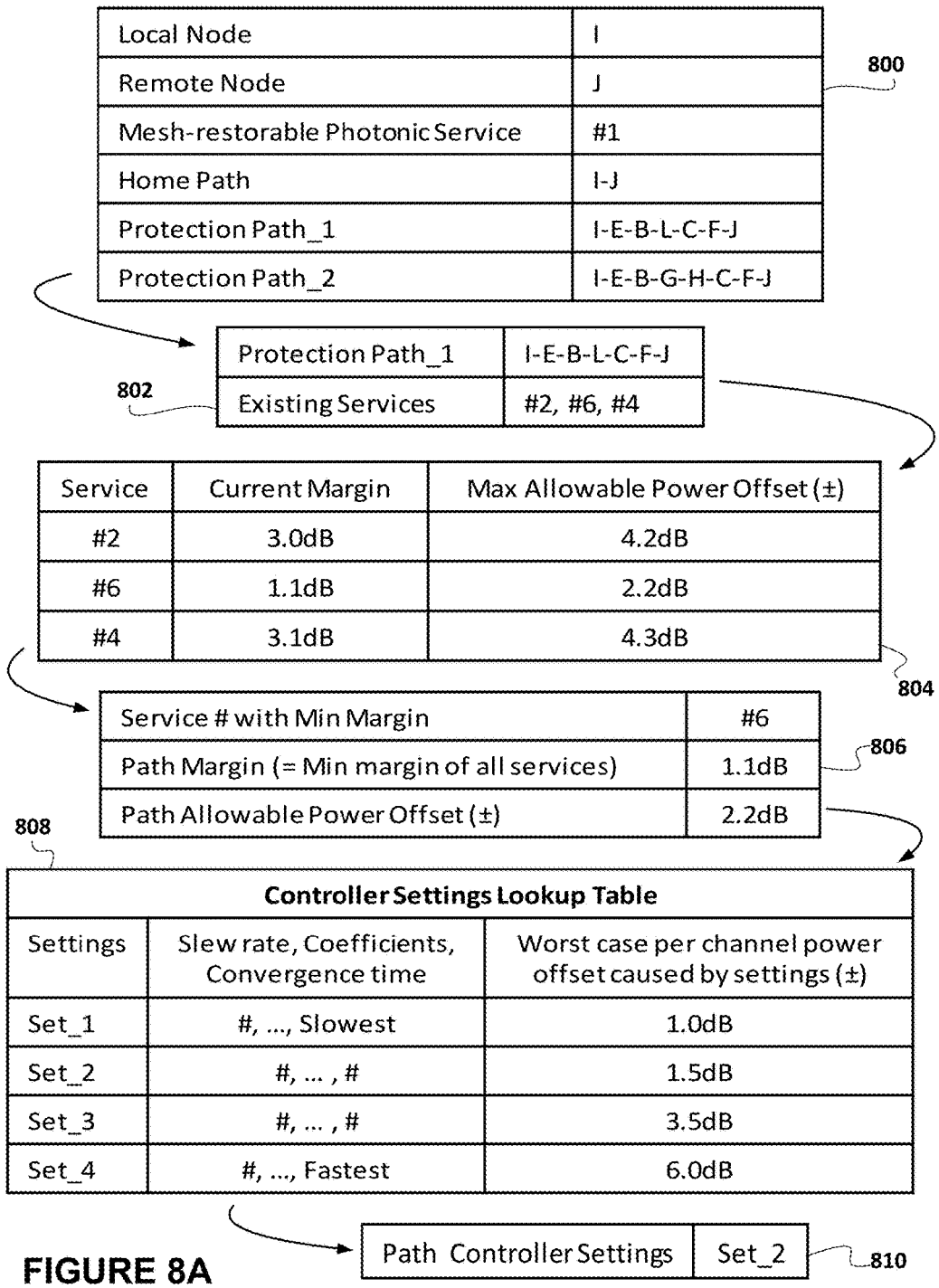
FIGS. 8A and 8B are schematic diagrams illustrating data sets employed by methods and systems in accordance with some implementations of the proposed solution.

In considering finding the appropriate controller settings and hence, the restoration speed for protection Path_1, option illustrated in FIG. 7B, with reference to FIG. 8A, the process starts with obtaining the provisioned service #1 information for example as illustrated in table 800. Selecting protection Path_1, table 802 illustrates three provisioned active services #2, #6 and #4, and partially sharing at least one optical section along protection Path_1. Next, as presented in table 804, the current available margin for each of these provisioned services are estimated, and then the margin value is further re-adjusted considering the penalty that would take place if MR service #1 and other possible mesh-restorable services are restored onto protection Path_1 for the same fiber fault event. Out of these existing services and their available re-adjusted margins, the Path Margin and Path Allowable Power Offset value are calculated. The re-adjusted margins, and the maximum power offset each service can tolerate is highlighted in table, for example as presented at 806. In accordance with the illustrated example service #6 plays the deciding factor which is then used to check in a controller settings lookup table 808 to select a set of controller settings which will provide a power offset less than the Path Allowable Power Offset value. The controller settings for protection Path_1 is then pre-saved 810 so that the control plane can apply those photonic controller settings applicable to all per channel photonic controllers/actuators in the protection path right before restoring (or adding a capacity for the first time) any photonic service or group of co-routed services on that path. Pre-saving such controller settings against a service path object is illustrated in FIG. 9A.

Figure 8B:
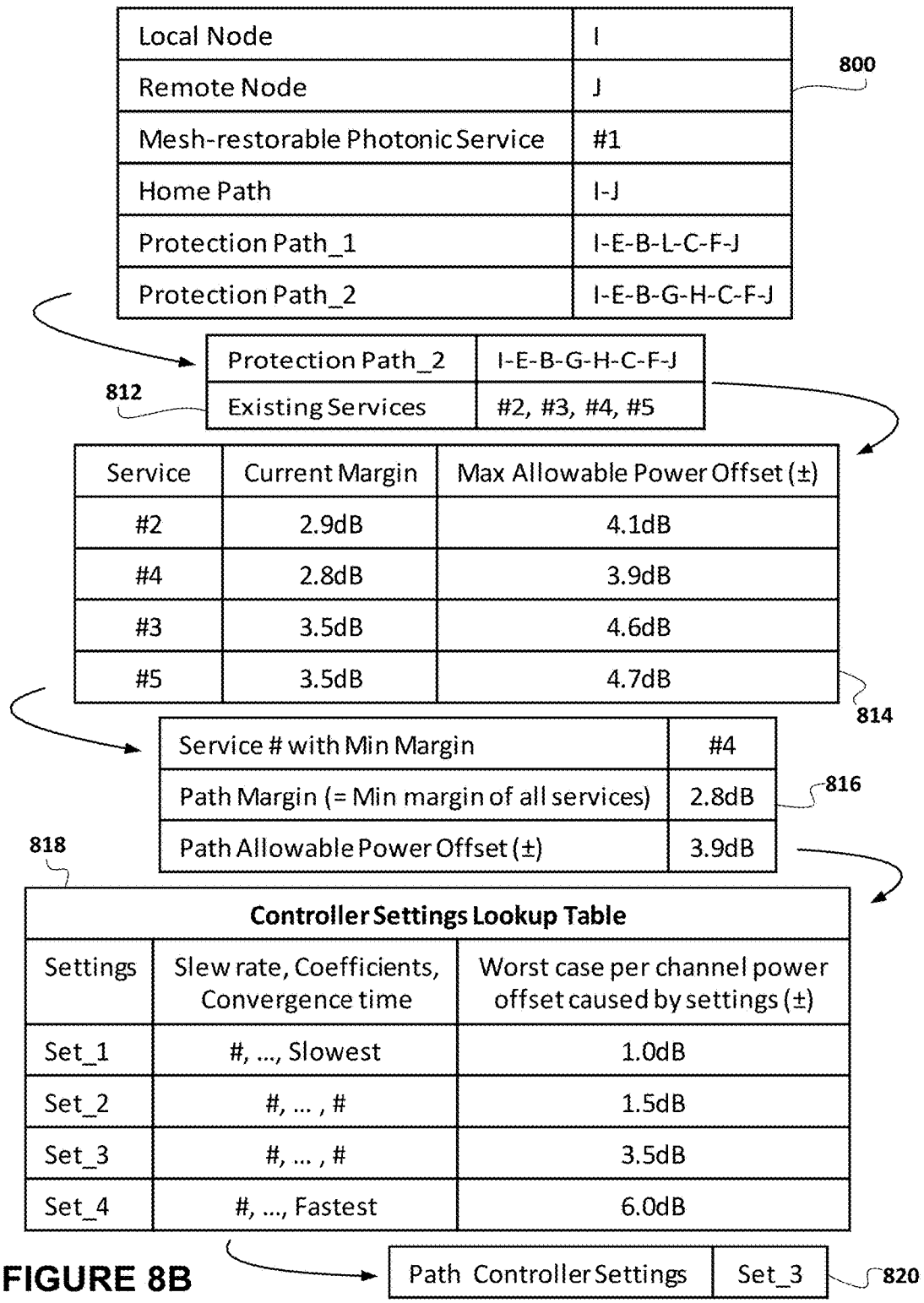

With reference to FIG. 8B, the proposed algorithm follows a similar approach for protection Path_2 (812) illustrated in FIG. 7C, where the algorithm finds a different service #4 at 814, 816 as the decider for Path Margin and Path Allowable Power Offset values and saves 820 the appropriate controller settings accordingly. The key point is, controller settings are determined 818 and saved FIG. 9A per protection path and not specific to an optical section. For example, the controllers in optical sections I-E, E-B, C-F, F-J will follow controller setting set_2 if services are restored using protection Path_1, while the same controllers will follow different controller setting (e.g. set_3) if protection Path_2 is used for restoration.

While each protection path is pre-calculated for a set of controller settings to provide a path-appropriate non-service affecting restoration speed, the method also allows a service specific restoration speed over-write capability, where the desired speed for a service can be pre-saved ahead of time regardless of the restoration path it takes or the existing services it may interrupt during the event of restoration, see FIG. 5. An example of such service specific over-write settings is highlighted in Table of FIG. 9B, where for a high priority mesh-restorable service (in this example, service #1), the fastest possible convergence time or restoration speed is desired, which will allow control plane to select a controller setting capable of providing the fastest end to end convergence at the time of restoration regardless of the restoration path it takes.

For certainty, while the invention has been described with respect to path restoration, it is understood that path restoration is the most stringent action requiring most stringent operation. The process above is understood to be employed in conjunction (either in sequence or in parallel) with deleting the photonic service on optical sections upstream or downstream of the failed link along the home service path #1. The process such as, but not limited to the process described above, is employed to provide settings to optical section controllers, settings which would ensure that existing active services provisioned via operational optical sections are not impacted by the photonic service delete. For example, delete actions on optical sections upstream of the fiber fault 60 and delete actions on optical sections downstream of the fiber fault 60 (not shown) can be performed concurrently providing an improved teardown speed.

Advantages of the proposed solution can be derived also when employed in new photonic service provisioning actions wherein existing active services along a proposed provisioning path must not be affected by the addition of a new photonic service. Once the provisioning path for a new photonic service is determined by the control plane, the process as described with respect to protection path examples presented in FIGS. 7B, 7C, 8A and 8B is followed where the protection path is replaced by provisioning path. In accordance with such implementation, the provisioning path providing fastest provisioning time can be selected over the other.

Higher layer routers and switches can be made aware of the expected Layer-0 restoration time, and their switch time can be programmed accordingly. In this way, per section photonic controllers, that have channels traversing all over the network with very much diversified topologies, can be set based on an end-to-end view of the per channel operating signal to noise ratio (SNR) margin or the total accumulated power fluctuations or steady-state power offset each individual channel can tolerate.

Figure 10:
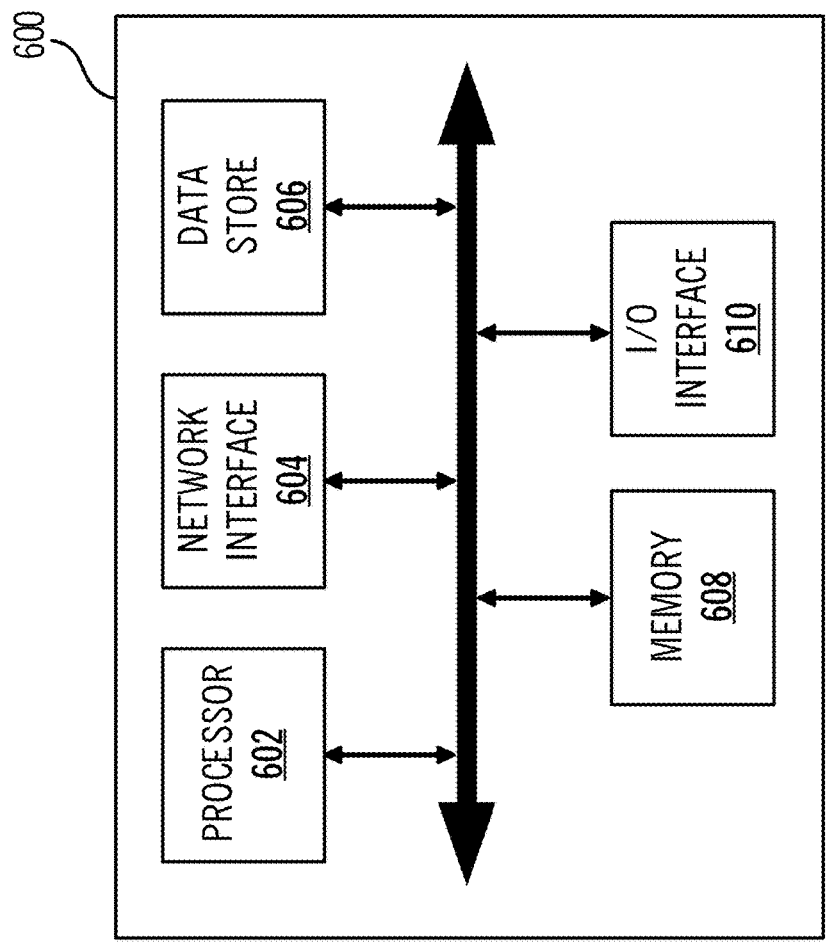
FIG. 10 is a schematic diagram illustrating a block diagram of an implementation of a controller, wherein similar features bear similar labels throughout the drawings. While the sequence described can be of significance, reference to "top", "bottom", "front" and "back" qualifiers in the present description is made solely with reference to the orientation of the drawings as presented in the application and does not imply any absolute spatial orientation.

Referring to FIG. 10, a block diagram illustrates an example of an implementation of a controller 600. For example, the controller 600 can include the sectional controller (not shown), the control plane server 54 or any other intermediary control plane controller. The controller 600 can be a digital processing device that, in terms of hardware architecture, generally includes a processor 602, input/output (I/O) interfaces 604, a network interface 606, a data store 608, and memory 610. It should be appreciated by those of ordinary skill in the art that FIG. 10 depicts the controller 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example but not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 can include address, control, and/or data connections to enable appropriate communications among the aforementioned components.

The processor 602 is a hardware device for executing software instructions. The processor 602 can be any custom made or commercially available processor, a central processing unit (CPU), an auxiliary processor among several processors associated with the controller 600, a semiconductor-based microprocessor (in the form of a microchip or chip set), or generally any device for executing software instructions. When the controller 600 is in operation, the processor 602 is configured to execute software stored within the memory 610, to communicate data to and from the memory 610, and to generally control operations of the controller 600 pursuant to the software instructions. The I/O interfaces 604 can be used to receive user input from and/or for providing system output to one or more devices or components. For example, if the controller 600 is included in a network element, the I/O interfaces 604 can include backplane connections or the like to communicate with other components in the network element. The network interface 606 can be used to enable the controller 600 to communicate on a network. For example, the I/O interfaces 604 and/or the network interface 606 can communicatively couple the controller 600 to a WSS in an OADM node 50, the amplifiers 66, an OPM, etc.

The data store 608 can be used to store data. The data store 608 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 can incorporate electronic, magnetic, optical, and/or other types of storage media. The memory 610 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 can incorporate electronic, magnetic, optical, and/or other types of storage media. Note that the memory 610 can have a distributed architecture, where various components are situated remotely from one another, but can be accessed by the processor 602. The software in memory 610 can include one or more software programs, each of which includes an ordered listing of executable instructions for implementing logical functions. The software in the memory 610 includes a suitable operating system (O/S) 614 and one or more programs 616. The operating system 614 essentially controls the execution of other computer programs, such as the one or more programs 616, and provides scheduling, input-output control, file and data management, memory management, and communication control and related services. The one or more programs 616 may be configured to implement the various processes, algorithms, methods, techniques, etc. described herein. For example, the programs 616 can be configured to implement method(s) 100.

Additionally, it will be appreciated that in accordance with some embodiments described herein, such as the controller 600, may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

While the invention has been illustrated and described with reference to preferred embodiments thereof, it will be recognized by those skilled in the art that various changes in form and detail may be made therein without departing from the spirit and scope of the invention as defined by the appended claims.

What is claimed is:

1. A method of estimating photonic service capacity change speed along an optical transport path in an optical network, the method comprising:
    determining first available margins of all existing first services actively provisioned along the optical transport path according to a then present optical loading condition along the optical transport path;
    readjusting each first available margin by a first additional margin penalty each first active service would incur when the photonic service capacity would be changed along the optical transport path;
    obtaining a path margin from the readjusted first available margins;
    determining a maximum path allowable power offset from the path margin; and
    indicating photonic controller settings which would generate less than the maximum path allowable power offset for all first active services along the transport path during the photonic service capacity change for network planning a non-service affecting photonic service capacity change.

2. A method as claimed in claim 1 wherein determining the first available margins of all first services actively provisioned along the transport path the method further comprises one of:
    querying one of: a photonic service provisioning database, a control plane, and an optical add drop multiplexer node controller along the transport path; and
    determining first available margins from performance metrics from a first transponder associated with each first service.

3. A method as claimed in claim 1 wherein readjusting each first available margin the method further comprises one of:
    performing a table lookup based on the first available margins to obtain the first additional penalty;
    determining the first additional penalty from functional dependency of calibration data;
    computing the first additional penalty based on an optical power perturbation model; and
    obtaining the first additional penalty from a neural network executing coded logic instructions of a machine learning algorithm to train the neural network on the optical network as the optical network undergoes changes in spectral loading on an ongoing basis.

4. A method as claimed in claim 1 wherein obtaining the path margin comprises selecting a minimum readjusted first available margin from all readjusted first available margins of all existing first services actively provisioned along the transport path.

5. A method as claimed in claim 1 wherein determining a maximum path allowable power offset the method comprises obtaining the maximum allowable power offset from one of: planned data points from SNR variations due to channel power changes and current system operating conditions.

6. A method as claimed in claim 1 further comprising pre-saving at least one photonic service capacity change controller setting for adding capacity along the transport path for one of:
    a new photonic service to be provisioned along the transport path,
    a faulted photonic service that would use the transport path as a protection path,
    a group of second photonic services that would use the transport path as a protection path as triggered by the faulted photonic service and
    a group of third co-routed photonic services that would use the transport path as a protection path as triggered by the faulted photonic service.

7. A method as claimed in claim 6 further comprising prior steps of:
    detecting at least one of an optical network fault and the faulted photonic service; and
    obtaining a faulted photonic service path.

8. A method as claimed in claim 7, wherein using the transport path to restore the faulted photonic service provisioned along the faulted photonic service path having remaining operational optical sections, for each optical section remaining in-service the method further comprising:
    determining second available margins of all existing second services actively provisioned along the optical section according to a then present optical loading condition along the faulted optical transport path;
    readjusting each second available margin by a second additional margin penalty each second active service would incur when the faulted photonic service would be removed from the optical section;
    obtaining an optical section margin from the readjusted second available margins;
    determining a maximum optical section allowable power offset from the optical section margin; and
    indicating photonic controller settings which would generate less than the maximum optical section allowable power offset for all second active services on the optical section for implementing non-service affecting photonic service capacity change.

9. A method as claimed in claim 8 wherein determining the second available margins of all second services actively provisioned along each remaining optical section the method further comprises one of:
- querying one of: a photonic service provisioning database, a control plane and an optical add drop multiplexer node controller along the faulted photonic service path; and
- determining second available margins from performance metrics from a second transponder associated with each second service.

10. A method as claimed in claim 8 wherein readjusting each second available margin the method further comprises one of:
- performing a table lookup based on the second available margins to obtain the second additional penalty;
- determining the second additional penalty from functional dependency of calibration data;
- computing the second additional penalty based on an optical power perturbation model; and
- obtaining the second additional penalty from a neural network executing coded logic instructions of a machine learning algorithm to train the neural network on the optical network as the optical network undergoes changes in spectral loading on an ongoing basis.

11. A method as claimed in claim 8 wherein obtaining the optical section margin comprises selecting a minimum readjusted second available margin from all readjusted second available margins of all existing second services actively provisioned along the faulted photonic service path.

12. A method as claimed in claim 8 wherein determining a maximum path allowable power offset the method comprises obtaining the maximum allowable power offset from one of: planed data points from SNR variations due to channel power changes and current system operating conditions.

13. A method as claimed in claim 1 wherein indicating photonic controller settings which would generate less than the maximum optical section allowable power offset the method comprises advertising the photonic controller settings.

14. A control plane server for estimating photonic service capacity change speed in an optical network, for each photonic service capacity change the control plane server being configured to:
- determine available margins of all existing services actively provisioned along an optical transport path according to a then present optical loading condition along the optical transport path;
- readjust each available margin by an additional margin penalty each active service would incur when the photonic service capacity would be changed along the optical transport path;
- obtain a path margin from the readjusted available margins;
- determine a maximum path allowable power offset from the path margin; and
- indicate photonic controller settings which would generate less than the maximum path allowable power offset for all active services along the transport path during the photonic service capacity change for network planning a non-service affecting photonic service capacity change.

15. A control plane server as claimed in claim 14 wherein being configured to indicate photonic controller settings which would generate less than the maximum path allowable power offset the control server is further configured advertise the photonic controller settings.

16. A control plane server as claimed in claim 14 wherein being configured to determine the available margins of all services actively provisioned along the transport path the control server is further configured perform one of:
- query one of: a photonic service provisioning database, a control plane, and an optical add drop multiplexer node controller along the transport path; and
- determine first available margins from performance metrics from a transponder associated with each service.

17. A control plane server as claimed in claim 14 wherein being configured to readjust each available margin the control server further comprises a processor configured to:
- perform a table lookup based on the available margins to obtain the additional penalty;
- determine the additional penalty from functional dependency of calibration data;
- compute the additional penalty based on an optical power perturbation model; and
- obtaining the additional penalty from a neural network executing coded logic instructions of a machine learning algorithm to train the neural network on the optical network as the optical network undergoes changes in spectral loading on an ongoing basis.

18. A control plane server as claimed in claim 14 wherein being configured to obtain the path margin from the readjusted available margins the control server further comprises a selector configured to select a minimum readjusted available margin from all readjusted available margins of all existing services actively provisioned along the transport path.

19. A control plane server as claimed in claim 14 wherein determining a maximum path allowable power offset the server being further configured to obtain the maximum allowable power offset from one of: planed data points from SNR variations due to channel power changes and current system operating conditions.

20. A control plane server as claimed in claim 14 further being configured to pre-set at least one photonic service capacity change controller setting for the transport path providing one of:
- a new photonic service to be provisioned along the transport path,
- a faulted photonic service to be restored along the transport path,
- a group of second photonic services that would use the transport path as a protection path and
- a group of third co-routed photonic services that would use the transport path as a protection path.

* * * * *